Oct. 14, 1958 W. T. CARDWELL, JR., ET AL 2,856,536
METHOD OF LOCATING A SECOND WELL BORE
Filed June 9, 1954
2 Sheets-Sheet 1

INVENTORS
WILLIAM T. CARDWELL, JR.
STANLEY B. JONES
BY
ATTORNEYS

Oct. 14, 1958 W. T. CARDWELL, JR., ET AL 2,856,536
METHOD OF LOCATING A SECOND WELL BORE
Filed June 9, 1954 2 Sheets-Sheet 2

INVENTORS
WILLIAM T. CARDWELL, JR.
STANLEY B. JONES
BY
ATTORNEYS

United States Patent Office 2,856,536
Patented Oct. 14, 1958

2,856,536

METHOD OF LOCATING A SECOND WELL BORE

William T. Cardwell, Jr., and Stanley B. Jones, Whittier, Calif., assignors to California Research Corporation, San Francisco, Calif., a corporation of Delaware Application June 9, 1954, Serial No. 435,504

5 Claims. (Cl. 250—71)

The present invention relates to a radiant energy method of exploring for petroleum deposits, more particularly to a method of determining the direction of a possible oil deposit after an unsuccessful well has been drilled into a favorable geological structure, and has for an object the provision of a method of and apparatus for exploring for a probable accumulation of petroleum by injecting a radioactive fluid into a favorable geological stratum traversed by an unsuccessful well bore and then measuring, within the same well bore, the movement of the radioactive fluid by detecting its distribution in the stratum, immediately after injection thereinto and at a time sufficiently later to permit formation fluid movement to transport the radioactive fluid in the direction of the entrapped petroleum deposit; said direction being determined by the detection of only those radiations from said fluid, which have the full energy of the emitting source within the tracer, and which are measured independently of radiations, either naturally present, or due to the radiation from the tracer being multiply-scattered, so that they are non-representative of the direction of movement of the formation fluids.

In the exploration for oil, an initial well is normally drilled at a location above a geological structure highly favorable for the main accumulation of oil. The exact location is of course dictated by the type of stratigraphic trap wherein the accumulation of oil is suspected. In the case of an anticline, the location of the first well is normally selected as near the top or most upwardly-projecting portion of the anticline, since this is apparently the most favorable location for the accumulation of oil. In the case of faults or pinch-outs, the well is normally located directly adjacent the edge of the fault, or adjacent the edge of the pinch-out; i. e., where the tilt of one earth formation relative to another is sufficiently different to permit oil to accumulate adjacent the intersection. Unfortunately, in the actual location of oil fields, it has been found that the main portion of the oil pool or reservoir, in which petroleum accumulates, frequently is displaced from the apparently most favorable location. One of the reasons for such displacement of the major oil pool from its expected location, as dictated by the geological structure, has been found to be the underground flow of liquids, particularly water, within the reservoir rock. This movement of fluid is, of course, in most instances quite slow; that is, of sufficiently small velocity to prevent the detection within the first well bore of the movement by normal flow-measuring methods. While it has been proposed to measure the direction of flow of fluids within a reservoir-type formation where numerous wells have been drilled by injecting fluid into one well bore and subsequently measuring the arrival of the tracer material at a second well bore, such methods are not feasible in evaluating the direction of an undiscovered oil pool in case a second well does not already exist.

In accordance with the present invention, there is provided a method of determining the probable location of a petroleum deposit from an unsuccessful well drilled into an apparently favorable geological formation. The method comprises detection of the direction of underground water flow from the same well bore by injecting into the formation or rock structure, wherein petroleum could have accumulated, a radioactive tracer material which may be forced outwardly into the formation and then observed over a period of time sufficient to permit the flow of formation fluid to re-distribute the tracer material. In a preferred method of carrying out this invention, a gamma-ray-emitting radiocative tracer, wherein the radioactive constituent is water-soluble so that it will penetrate the formation rock and flow with the formation water, is injected into the formation. The direction of the flow of the fluid into the formation is then determined by measuring only those gamma rays whose energies are characteristic of the tracer element. A subsequent measurement is then made of the distribution of the full-energy, or unscattered, gamma rays arriving from the tracer element after the tracer has been distributed by the formation fluid flowing in a direction toward the accumulated deposit of petroleum.

Various other objects and advantages of the present invention will become apparent from the following detailed description of the preferred method of carrying out the invention as disclosed in the following detailed specification and the accompanying drawings, which form an integral part of the present specification.

Figure 1:
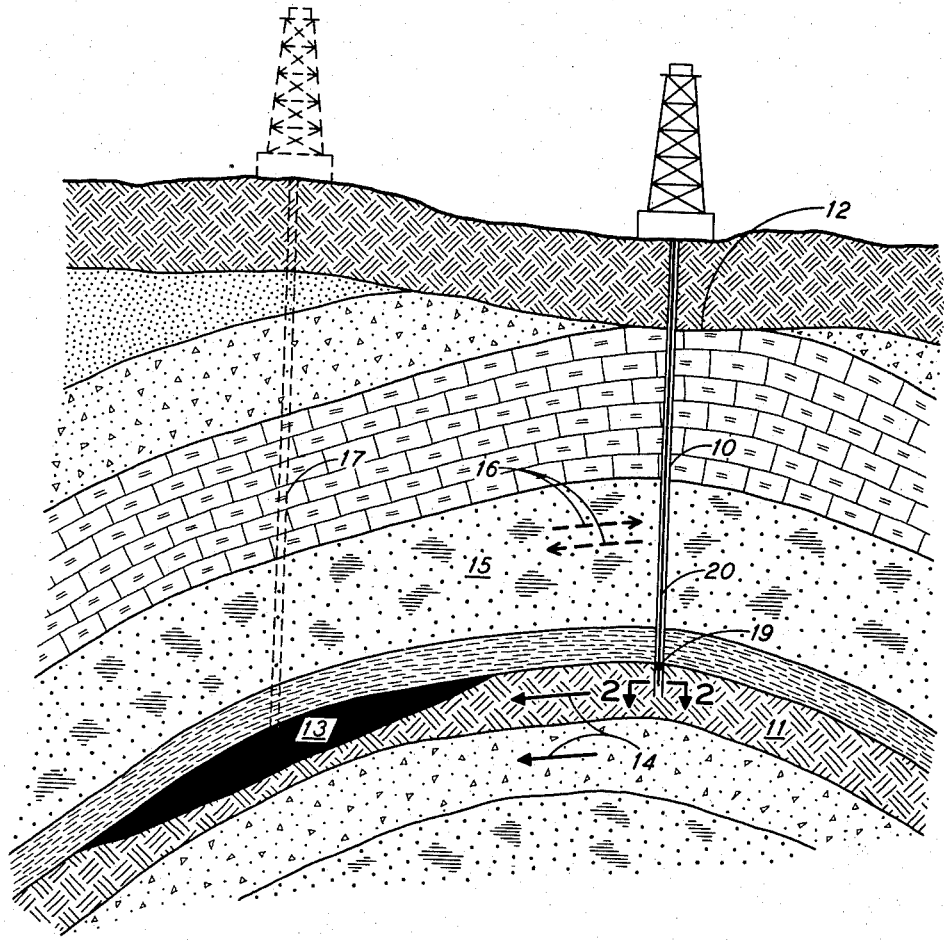
Fig. 1 is a cross-sectional view of a first oil well drilled into an apparently favorable geological structure, and particularly illustrates the application of the present invention to the determination of the location of a displaced petroleum deposit to permit the favorable location of a second well bore, which is illustrated in phantom.

Referring now to the drawings, and in particular to Fig. 1, there is illustrated at 10 a bore hole drilled into an object formation 11, which is of the petroleum reservoir-type rock which may be encountered in a favorable geological structure, such as anticline 12. The original positioning of well bore 10 is, of course, dictated by the best geological information available and is selected upon the basis of outcrops of formations, gravity surveys or seismic reflection surveys. As indicated, this position is generally at about the top of the anticline. Unfortunately, it has been found in practice that the oil accumulation may not occur at the top of the anticline but may accumulate at some other location, such as the down-structure position indicated to the left in Fig. 1. This accumulation, identified as 13, is at a down-structure location but still within the reservoir formation 11. One reason for this displaced location of "pool" 13 is believed to be due to the flow of formation water within the favorable stratum of the anticline. In the present instance, this direction of flow is indicated by the arrows 14. The direction of such flow may be entirely independent of the ground water flow in the upper strata 15, as indicated by arrows 16. Thus, the direction in which the oil accumulation may lie from the first drilled well bore 10 cannot readily be predicted by such ground water flow.

In accordance with the present invention, a method of predicting the direction of departure from the first drilled well bore 10, in which the second well bore 17 should be drilled, may be determined by the introduction of a gamma-ray-emitting radioactive tracer fluid or material into formation 11 and forcing said tracer liquid outwardly from the bottom of well bore 10.

Desirably, the radioactive tracer, as mentioned above, is a gamma-ray emitter so that the fluid containing the material will produce a penetrative type radiation which may be detected at the original well bore after the tracer containing the radioactive isotope has penetrated several feet into the rock comprising formation 11. Further, the tracer element is preferably a part of a water-soluble compound which will not be adsorbed on the rock. Examples of such radioactive compounds include cesium chloride, or sodium chloride, in which the radioactive isotopes are, respectively, cesium 137 and sodium 22.

Figure 2A:
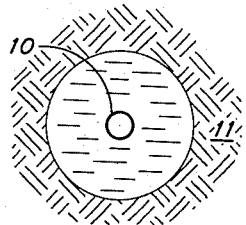
Fig. 2A is a representation of the distributional pattern of a radioactive tracer fluid around the bore hole immediately after injection of the fluid into the reservoir rock.

In the application of this radio active tracer, containing the gamma-ray-emitting substance into well bore 10, the lower portion of the bore hole is packed off so that substantially only the formation under study will have introduced thereinto the tracer fluid. The packer is indicated diagrammatically as 19, and, as shown, the pipe string 20 extends downwardly through the packer 19 into open communication with the bottom of bore hole 10. It will be understood, of course, that if the objective formation lies a considerable distance above the bottom of the well bore, the well bore will be isolated both above and below the objective formation. Desirably, the fluid is applied under sufficient pressure so that the liquid will not only displace the fluid in the well bore but will penetrate the formation in a radial direction around the well bore. The general pattern of this radioactive fluid is indicated in Fig. 2A when it is first introduced into the well bore.

Figure 2B:
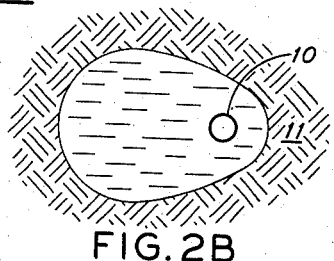
Fig. 2B is similar to Fig. 2A but illustrates the distribution of the radioactive tracer fluid after a sufficient period of time to permit formation water flowing within the reservoir rock to displace the tracer fluid in the direction of the petroleum deposit.

After a period of time, sufficiently long to permit the flowing water within the formation to travel in the direction of arrows 14, the radioactive fluid will be distributed in a pattern somewhat like the configuration shown in Fig. 2B; that is, the radioactive fluid will be substantially displaced to the left, as viewed in the plan view of bore hole 10 taken in the direction of arrows 2—2 in Fig. 1.

Figures 3, 4:
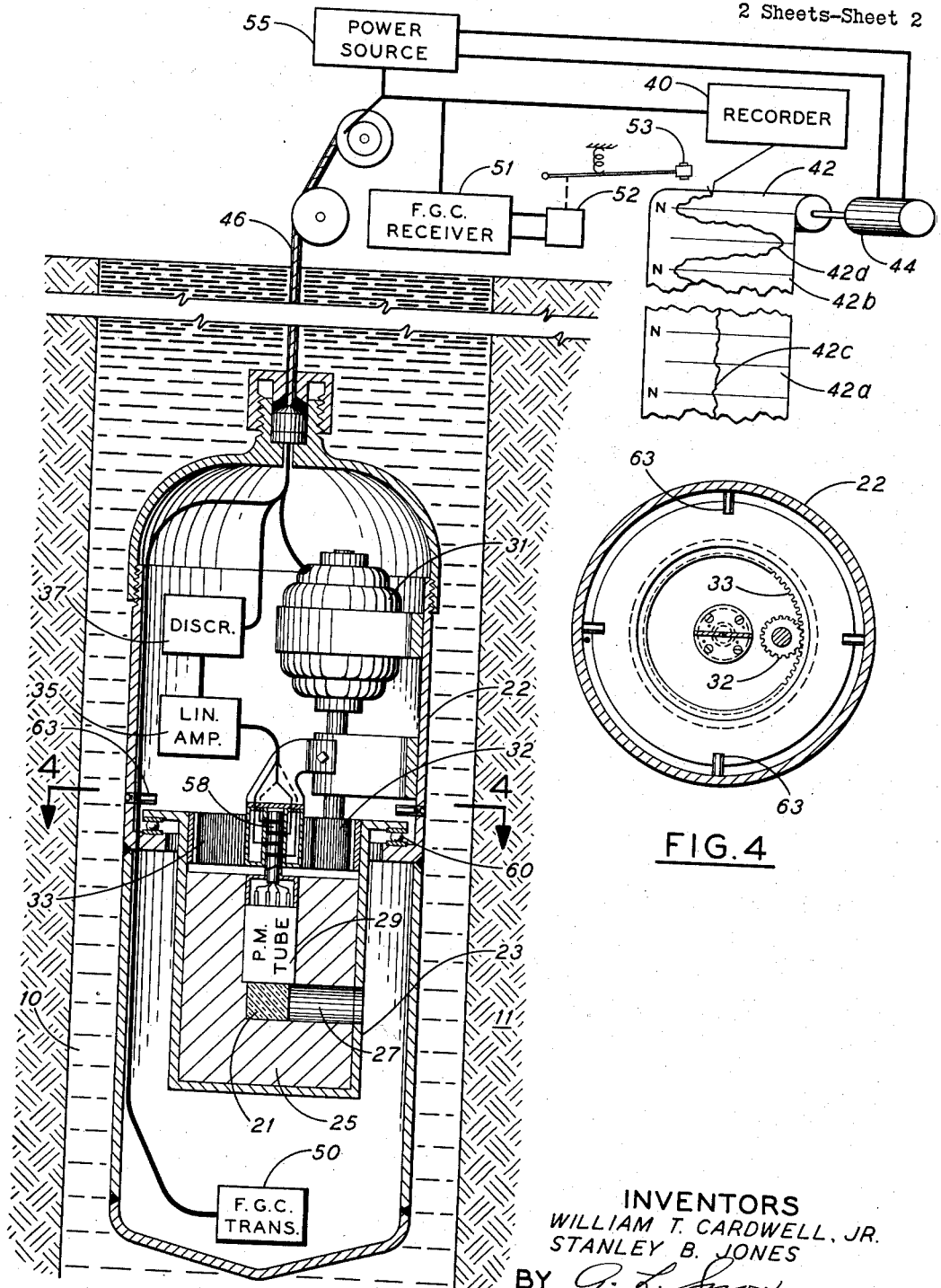
Fig. 3 is a schematic representation of a directionally-sensitive radiation detecting apparatus useful in determining the distribution of a radioactive tracer around the well bore.
Fig. 4 is a cross-sectional view through the detecting apparatus taken in the direction of arrows 4—4 in Fig. 3.

In accordance with the method of the present invention, the direction of dispersion or radial distribution of radioactive fluid from bore hole 10 is detected by a radiation detector capable of discriminating and measuring only the gamma rays which are characteristic of the emitting nucleus, without interference from either the naturally-present gamma rays or gamma rays which have suffered scattering within the formation or well bore. This method of detecting the gamma radiation is highly diagnostic of the true distribution, since the back-scattered radiation arriving in the bore hole from the gamma-radiating isotope may easily attain a total activity which is not at all indicative of the direction of dispersion of the main body of fluid containing the radioactive material. The primary reason for this is that the total number of gamma radiations from the immediate vicinity of the bore hole wall may be much greater than the total number of radiations traveling without scattering to the detector from the emitting nuclei. In accordance with the present invention, we utilize a radiation detector arrangement capable of measuring both the direction and the energy of individual gamma rays arriving in the bore hole from the body of radioactive material. As particularly illustrated in Fig. 3, this arrangement includes a scintillation crystal 21 rotatably mounted within shield means 23, positioned within logging sonde 22. Crystal 21, in accordance with the present invention, is made directionally sensitive to gamma rays entering the bore hole by forming a window or port 27 opening through the side of a gamma-ray-absorbing medium 25, such as lead, bismuth or the like.

Scintillation crystal 21 is provided with a photomultiplier tube 29 which is capable of producing an electrical pulse corresponding in amplitude to the energy of each gamma ray detected by the crystal. In the present arrangement, the total number of light photons generated by a single gamma ray entering scintillation crystal 21 corresponds to the energy of that gamma ray, and an electrical pulse is produced by linear amplifier 35, which has an amplitude corresponding to said total number of light photons. Accordingly, the individual energy of each gamma ray detected by crystal 21 is effectively measured.

In the detection of the direction of movement of the radioactive tracer material after its introduction into bore hole 10, shield means 23, supported by ball bearing 60, is slowly and repeatedly rotated throughout 360 degrees of movement by drive motor 31 operating through pinion gear 32 and ring gear 33. The structural details of this ring and pinion gear drive of the shield means 23 is more particularly illustrated in the cross-sectional view shown in Fig. 4. As further shown in Figs. 3 and 4, a plurality of stops, in the form of pins 63, are provided to maintain shield means 23 in engagement with the upper race of ball bearing 60 even when sonde 22 is tipped or laid on its side.

As shield means 23 is rotated, the gamma rays to be detected by crystal 21 are permitted to pass through the gamma ray window formed by port 27, and each of these gamma rays is measured by the electrical circuit, including photomultiplier tube 29, which is connected through slip-ring and brush assembly 58 to a linear amplifier 35 and a discriminator 37. Discriminator 37, in accordance with the invention, is preset to pass upwardly to the surface recorder 40 only those pulses which correspond to the full energy of the gamma rays originating within and directly transmitted by the radioactive isotope of the tracer material or fluid. Thus, the pulses form a signal which is a measure of the distribution of the tracer around the bore hole. This signal is preferably recorded by recorder 40 on chart 42 which is driven by paper drive motor 44 and arranged to be operated in synchronism with shield and detector drive motor 31.

The line 42C on the lower portion 42A of chart 42 indicates in general the distribution of the gamma-ray-emitting tracer when the tracer is first introduced into the well bore and is distributed about a pattern such as that ideally illustrated in Fig. 2A. The upper portion 42B of chart 42 indicates by the varying curve 42D the manner of distribution of the radioactive material around well bore 10 after movement of the formation water has produced a pattern substantially as shown in Fig. 2B. As mentioned above, these curves are a measure of only those gamma rays which have not suffered scattering within the formation and, accordingly, have traveled directly from the emitting nucleus to the detector.

As illustrated by the apparatus disclosed herein, the well logging sonde 22 is adapted to be positioned in the well bore by a simple cable 46 which, of course, does not restrict the instrument itself from rotating as it is raised or lowered in the well bore. For this reason, the casing or housing of sonde 22 is desirably formed of brass or other non-magnetic materials, and a flux gate compass 50 is positioned therein for measuring the direction of the earth's magnetic field. The flux gate compass 50, including a transmitter, is operated to indicate the orientation of the sonde in the well bore, and this information is transmitted to a flux gate compass receiver, identified as 51. Receiver 51 is adapted to operate a relay mechanism designated as 52 for stamping on record 42 an indication of magnetic north, as indicated by the letter "N" appearing on chart 42. The stamping mechanism is designated as 53. Recorder 40 and the flux gate compass system are synchronized to assure proper registry of the earth's magnetic north and the measured signal.

From chart 42, the direction of movement of the formation fluid may be determined and the direction of the major accumulation of oil from the first bore hole inferred.

In a preferred method of carrying out the present invention, the radioactive fluid remaining in the bore hole, after the radioactive tracer has been forced outwardly into formation 11, is removed from the bore hole by flushing or baling, or otherwise is displaced, so that measurement of the angular distribution of tracer fluid in the formation around the well bore will not be adversely affected by an inordinate number of gamma rays arriving at the scintillation crystal 21 from the fluid remaining in the well bore.

While the exact method of introducing the radioactive tracer material into the well bore is not critical, nor is the method of detecting the position to which the fluid moves under the influence of flowing formation water, it will be appreciated that a method has been provided by the present invention for determining from a single "dry" hole the direction in which a second well should be drilled in order to intercept the main body of oil accumulated within a stratigraphic trap. As particularly emphasized in the foregoing description, all of such measurements are made within a single well bore rather than in a plurality of well bores by detecting only those radiations emitted by the tracer and arriving at the detector with their characteristic full energy.

Gamma rays have been described herein as the preferred form of radiations for detecting fluid movement in the formation due to the ability of such radiations to penetrate the formation and arrive at the detector with their full energies even after the tracer fluid has been displaced from the bore hole to a distance of several times the diameter of the bore hole. Desirably, the full energy of the gamma ray emitted by the tracer is at least 1 Mev., and preferably greater, to assure the reception of as many non-scattered gamma rays as possible.

While various modifications and changes in the apparatus useful in performing the method of the present invention will occur to those skilled in the art, as well as variations in the exact procedure for carrying out said method, all such modifications and changes that fall within the scope of the appended claims are intended to be included therein.

We claim:

1. The method of detecting in a single "dry" borehole the location of an oil pool in an apparently favorable reservoir-type formation penetrated by said "dry" borehole comprising the steps of injecting a radioactive tracer material into the reservoir-type formation through said single borehole, disposing within said borehole adjacent said formation an energy-sensitive radiation detector immediately after the injection of said tracer material, measuring the angular distribution of said material by detecting therefrom those penetrating radiations possessing the characteristic initial energy of said tracer material, then repeating in said single borehole the angular distribution measurement of radiations possessing said characteristic initial energy of said tracer material at a time sufficiently subsequent to the first measurement to permit said tracer material to migrate in said formation, and then comparing the angular distribution of the detected characteristic radiations from said first measurement with those from the second measurement in the same borehole as an indication of the direction of the most favorable location where a second borehole should be drilled into said apparently favorable formation.

2. The method of detecting in a single borehole the location of an oil pool in an apparently favorable reservoir-type formation after drilling a "dry" borehole thereinto comprising the steps of injecting into the reservoir-type formation through said single borehole gamma-ray-emitting radioactive tracer material, disposing within said borehole adjacent said formation an energy-sensitive gamma ray detector immediately after said injection, measuring the angular distribution of said tracer material around said borehole by detecting gamma rays emitted therefrom possessing the characteristic full initial energy and repeating in said well bore the angular distribution measurement of said gamma rays possessing said characteristic full initial energy at a time subsequent to the first measurement so that said tracer material can migrate in said formation, and comparing the angular distribution of said characteristic gamma rays from said first measurement with those from the second measurement in the same borehole as an indication of the direction of the most favorable location for drilling a second borehole into said favorable formation.

3. The method of detecting in a single borehole the location of an accumulation of petroleum in a stratigraphic trap comprising the steps of introducing into a portion of a formation traversed by said borehole which is unproductive of petroleum a gamma-ray-emitting radioactive tracer, progressively following the distribution of said radioactive tracer material in said formation from a location in said borehole adjacent to the point and where said tracer was introduced by detecting the relative distribution of the characteristic full energy of individual gamma radiations emitted by said tracer which have not suffered Compton scattering, and indicating said relative distribution of said tracer from said point as it is affected by the flow of fluids in said formation, the indication being made in accordance with the orientation of said distribution in said earth formation.

4. The method of determining in a single borehole the most favorable location for the drilling of a second well bore after a "dry" bore hole has been drilled into a favorable geological structure comprising the steps of packing off the suspected petroleum-reservoir formation from the remainder of said bore hole, forcing a fluid containing a soluble gamma-ray-emitting material into said formation, said fluid being supplied to said formation from said single bore hole to permit said fluid including said tracer to be forced outwardly into the formation, positioning an energy-sensitive gamma ray detector within said well bore adjacent said formation, radially rotating said detector and measuring the total number of gamma rays having the full characteristic energy of non-scattered gamma radiation arriving from said radioactive material, recording the radial distribution of the detected full energy gamma rays and subsequently repeating said recording at the same location in said bore hole of the detected full energy gamma rays after a sufficient time to permit underground water flowing in said formation to redistribute said radioactive tracer in the direction of the probable accumulation of petroleum in said reservoir rock, said direction being indicated by a greater number of gamma rays having the full characteristic energy of said rays, when emitted by said tracer, being in the direction toward said petroleum reservoir.

5. The method of determining in a single bore hole the most favorable location for the drilling of a second well bore after a "dry" bore hole has been drilled into a geological structure comprising the steps of packing off the suspected petroleum-reservoir formation from the remainder of said bore hole, supplying a fluid containing a soluble gamma-ray-emitting material to said well bore adjacent said formation, forcing said fluid into said formation from said well bore to permit said fluid including said tracer to flow outwardly into the formation, displacing the remainder of said fluid containing said tracer from the portion of said well bore adjacent said formation, positioning an energy-sensitive gamma ray detector within said well bore adjacent said formation, radially rotating said detector and measuring the total number of gamma rays having the full characteristic energy of non-scattered gamma radiation arriving from said radioactive material, recording the radial distribution of the detected characteristic gamma rays and subsequently repeating said recording of the detected characteristic gamma rays after a sufficient time to permit underground water flowing in said formation to redistribute said radioactive tracer in the direction of the probable accumulation of petroleum in said reservoir rock, said direction being indicated by a greater number of gamma rays having said full characteristic energy of said rays, when emitted by said tracer, being in the direction toward said petroleum reservoir.

References Cited in the file of this patent

UNITED STATES PATENTS

| | | |
|---|---|---|
| 2,316,361 | Piety | Apr. 13, 1943 |
| 2,332,873 | Silverman | Oct. 26, 1943 |
| 2,429,577 | French | Oct. 21, 1947 |
| 2,648,012 | Scherbatskoy | Aug. 4, 1953 |

UNITED STATES PATENT OFFICE
CERTIFICATE OF CORRECTION

Patent No. 2,856,536                           October 14, 1958

William T. Cardwell, Jr., et al.

It is hereby certified that error appears in the printed specification of the above numbered patent requiring correction and that the said Letters Patent should read as corrected below.

Column 6, line 26, after "point" strike out "and".

Signed and sealed this 24th day of February 1959.

(SEAL)
Attest:

KARL H. AXLINE
Attesting Officer

ROBERT C. WATSON
Commissioner of Patents